June 1, 1965   V. J. SLINKER   3,186,246
INDEXING MECHANISM
Filed Feb. 11, 1963

INVENTOR.
Virgil J. Slinker
BY
Barnard, McGlynn & Reising
ATTORNEYS 3,186,246
INDEXING MECHANISM
Virgil J. Slinker, 3059 Edgewood Park Court,
Union Lake, Mich.
Filed Feb. 11, 1963, Ser. No. 257,381
11 Claims. (Cl. 74—128)

The subject matter of this invention is an improved indexing mechanism useful, for example, in manufacturing machinery for indexing a worktable to various rotary work stations or positions. The invention has as its principal object the provision of relatively simple and therefore inexpensive mechanism which has as one of its outstanding features means for positively locking the worktable or other indexed member against movement in any of its indexed positions. Another object is the provision of a mechanism of the type described which assures against any counter rotation of the indexed member during the indexing sequence. These and other objects, features, and advantages of the invention will appear more clearly from the following detailed description thereof, made with reference to the appended drawings in which:

Figure 1:
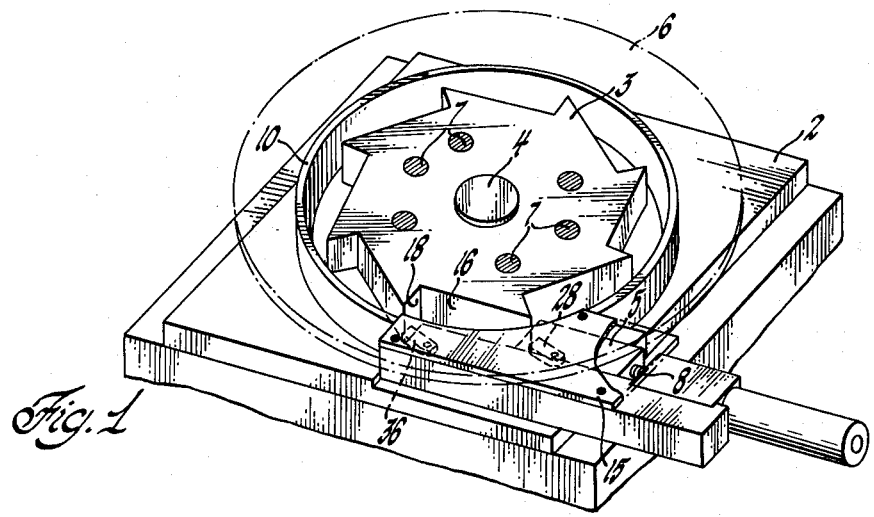
FIGURE 1 shows a perspective view, partially in phantom, of a preferred embodiment of the invention.

Referring now to the drawing, the indexing mechanism shown includes a support plate 2 which can be the base of the manufacturing machinery in which the indexing mechanism is used, a toothed indexing wheel 3 mounted for rotation on the support by means of a pin 4 secured to the support, and a plunger 5 which is mounted on the support and which is reciprocable to an extended position and to a withdrawn position in the plane of the indexing wheel and in a direction generally tangential thereto.

The worktable 6 to be indexed is shown in phantom and is secured concentrically to the tooth rotary member in any suitable manner as for example by bolts extending into the openings 7 in the top of the rotary member. Any suitable means, mechanical or pneumatic, can be used to move the plunger 5 to its extended and withdrawn positions; in the embodiment shown the plunger is mechanically actuated by the rod 8 slidably supported by the guide 9. A generally ring-shaped metal guard 10 secured to the support plate surrounds and serves as protection for the indexing wheel 4 and a pair of elongate flat sided metal bars 12 and 14, also secured to the support plate serve as guides for the reciprocable movement of the plunger. A plate 15 secured to the guide bars co-operates with the guide bars to form a protective housing for the plunger.

The periphery of the indexing wheel is formed by a plurality of identical circumferentially arranged teeth, each tooth having an elongate flat surface 16 extending in a direction generally tangential to the wheel and a flat surface 18 extending radially outwardly of the center of rotation and joining the tangential surface of the tooth to that of the next adjoining tooth.

The plunger 5 has opposed rectangular-shaped flat side surfaces 20 and 22, one of which is in slidable contact with the side surface of guide bar 12 and the oppositely disposed side surface of which is in face-to-face contact with the tangential surface 16 of a tooth on the indexing wheel when the plunger is in its extended reciprocative position and in slidable contact with guide bar 14 when the plunger is in its withdrawn position. As can best be seen in FIGURE 3, the flat surface 24 of the plunger at the free end thereof is in face-to-face contact with the joining surface 18 of a tooth when the plunger is in its extended position.

Figure 2:
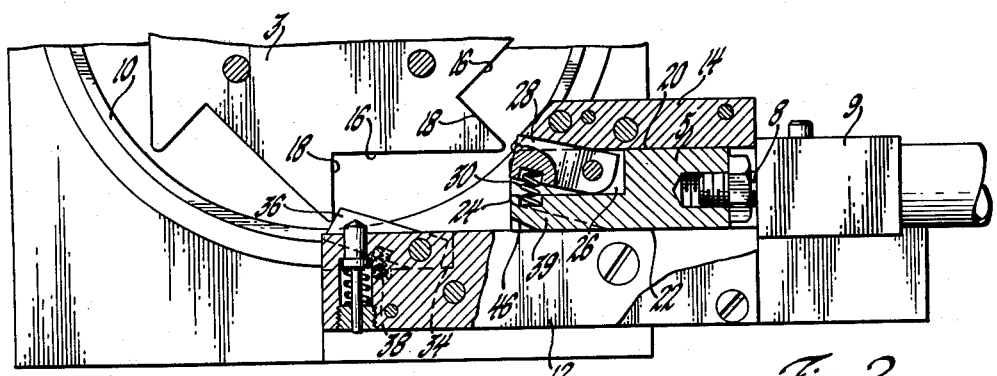
FIGURE 2 is a top fragmentary view with parts broken away and in larger scale of the embodiment shown in FIGURE 1.

Referring now in particular to FIGURE 2, the flat side surface 22 of the plunger is formed with a narrow, axially extending recess 26 adjacent its free end, this recess accommodating a pivotally mounted drive dog 28 and a spring 30 between the dog and the wall of the recess to bias the dog outwardly. The dog is shaped such that when it is in its inward position against the bias of the spring, its outer surface is substantially flush with the side surface of the plunger, and when it is in its outward position under the bias of the spring, it extends beyond the side surface of the plunger. A tapered recess 32 in the side wall of guide bar 14 permits but limits the extent of outward movement of the dog when the plunger is in its withdrawn position.

Figure 3:
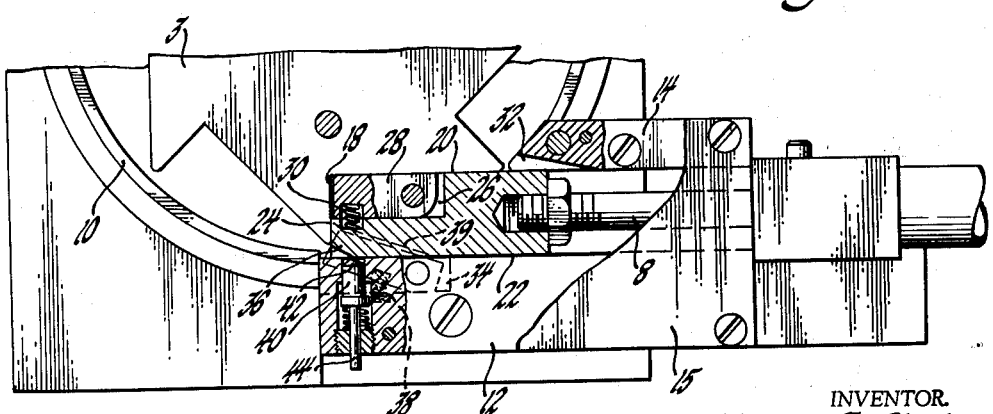
FIGURE 3 is a top view of the FIGURE 1 embodiment, but showing the parts in different operative positions to illustrate the sequence of operation of the mechanism.

A similar dog assembly is provided in the guide bar 12. That is, the side surface of this guide bar has a narrow, axially extending recess 34 with a pivotally mounted stop dog 36 therein biased outwardly by the spring 38, the dog being shaped such that in its outer position it extends beyond the side surface of the guide bar and into the rotary path of the tooth surface 18. A tapered recess 39 in the side surface 22 of the plunger permits the stop dog 36 to take its outer position under the bias of spring 38 even when the plunger is in its extended position as shown in FIGURE 3.

FIGURES 1 and 2 show the sequence of operation. Referring to FIGURE 1, when the plunger 14 is in its withdrawn position, it is slightly out of contact with the teeth on the indexing wheel and the drive dog 28, as well as the stop dog 34, are spring biased to their outer positions. Upon initial movement of the plunger toward its extended position, the drive dog 28 contacts the outer edge of a tooth surface 18. Hence, as the plunger is moved to its extended position, the indexing wheel 4 is rotated. Initially the rotation is by way of contact with the drive dog; however, after only slight rotation the surface 18 moves into contact with the end surface 24 of the plunger and thereafter the continued rotation of the indexing wheel is caused by this contact. As the rotation continues, tangential surface 16 moves into contact first with the drive dog and then with the side surface of the plunger, thereby depressing the dog into its recessed position. Also, as the indexing wheel turns by reason of the movement of the plunger, a tooth on the wheel depresses the stop dog 36 into its recess in the guide bar 12 until the tooth rides over the stop dog to allow it to again assume its outer spring biased position. FIGURE 3 shows the mechanism at the end of this sequence. In its outmost extended position, the plunger has its two opposed side surfaces in face-to-face contact with the tangential surface 16 of the indexing wheel and the inner surface of the guide bar 12 respectively, and its free end surface in face-to-face contact with the surface 18 of the indexing wheel. Hence, in its extended position the plunger is wedged between the indexing wheel and the guide bar 12 and forms a solid, strong lock against any movement of the indexing wheel worktable. To move the worktable to its next indexed position, the plunger is first withdrawn until the drive dog 28 moves to its outer spring biased position. Stop dog 36, being in its outer position and therefore in contact with tooth surface 18, prevents any counter rotation of the rotary member and worktable during plunger withdrawal or while the plunger remains in its withdrawn position. To repeat the cycle, the plunger is again moved to its extended position to cause the above sequence to repeat and thereby index the worktable to the next rotary position.

Particularly where the mechanism is used to index a table to different work stations, it will generally be required to incorporate suitable means for operating a switch to actuate the work machinery at the various stations upon indexing of the table. Such a switch actuator is illustrated at 40 and comprises a small cylindrical rod with a conical front surface 42 and an integral rearwardly extending pin 44, a spiral spring biasing the rod to an outward position when the plunger 5 is withdrawn as shown in FIGURE 2. As the plunger moves to its extended position, a tapered area 46 on the side of the plunger engages the conical front surface of the rod and forces the rod to its rearward position as shown in FIGURE 3. Pin 44 can be operatingly connected to a switch such that each time the plunger reciprocates, a tool or tools can be actuated to perform work on the articles transported by the worktable.

Hence, the invention provides a relatively simple, sturdy indexing mechanism which assures against movement of the worktable in any of its indexed positions. Also, undesirable counter rotation of the worktable is prevented.

It will be understood that while the invention has been described in detail specifically with reference to a preferred embodiment thereof, various modifications may be made, all within the full and intended scope of the claims which follow.

I claim:

1. In an indexing mechanism, a rotatably mounted indexing wheel member having its outer periphery formed with a plurality of circumferentially arranged teeth each having a surface extending generally tangentially of a circle having a center coincident with the center of the wheel member and a surface extending generally outwardly of the center of the wheel member, a plunger member mounted for movement between a withdrawn position and an extended position in a direction generally tangential to said circle, said plunger member abutting the tangential surface of one of said teeth and the adjacent outwardly extending surface of one of said teeth when said plunger is in its extended position to thereby lock the wheel member against rotary movement when the wheel member is in one of its indexed positions, and means on one of said members to provide wheel rotation inducing contact therebetween when said plunger member is moved from its withdrawn position to its extended position.

2. In an indexing mechanism, a rotatably mounted indexing wheel having its outer periphery formed with a plurality of circumferentially arranged teeth each having a surface extending generally tangentially of a circle having a center coincident with the center of the wheel and a surface extending generally outwardly of the center of the wheel, a plunger mounted for movement between a withdrawn position and an extended position in a direction generally tangential to said circle, said plunger abutting the tangential surface of one of said teeth and the adjacent outwardly extending surface of one of said teeth when said plunger is in its extended position to thereby lock the wheel against rotary movement when the plunger is in one of its indexed positions, and means on said plunger to make rotation inducing contact with said wheel when said plunger is moved from its withdrawn position to its extended position.

3. An indexing mechanism comprising a rotatably mounted indexing wheel having its outer periphery formed with a plurality of circumferentially arranged teeth each having a surface extending generally tangentially of a circle having a center coincident with the center of the wheel and a surface extending generally outwardly of the center of the wheel, a plunger mounted for movement between a withdrawn position and an extended position in a direction generally tangential to said circle, said plunger abutting the tangential surface of one of said teeth and the adjacent outwardly extending surface of one of said teeth when said plunger is in its extended position to thereby lock the wheel against rotary movement when the plunger is in one of its indexed positions, means on said plunger to make rotation inducing contact with said wheel when said plunger is moved from its withdrawn position to its extended position, and means to prevent counter rotation of said wheel while said plunger is in its withdrawn position.

4. In an indexing mechanism, a rotatably mounted indexing wheel having its outer periphery formed with a plurality of circumferentially arranged teeth each having a surface extending generally tangentially of a circle having a center coincident with the center of the wheel and a surface extending generally outwardly of the center of the wheel, a plunger mounted for movement between a withdrawn position and an extended position in a direction generally tangential to said circle, said plunger abutting the tangential surface of one of said teeth and the adjacent outwardly extending surface of one of said teeth when said plunger is in its extended position to thereby lock the wheel against rotary movement when the plunger is in one of its indexed positions, means on said plunger to make rotation inducing contact with said wheel when said plunger is moved from its withdrawn position to its extended position, and a movable member biased to a position in contact with said wheel while said plunger is in its withdrawn position to thereby prevent counter rotation of said wheel.

5. In an indexing mechanism, a support, an indexing wheel rotatable on the support and having its outer periphery formed with a plurality of circumferentially arranged teeth each having a surface extending generally tangentially of a circle having a center coincident with the center of the wheel and a surface extending generally outwardly of the center of the wheel, a plunger secured to said support for movement between a withdrawn position and an extended position in a direction generally tangential to said circle, and a guide bar secured to said support to guide the movement of said plunger, said plunger having a side surface abutting the tangential surface of one of said teeth, an oppositely disposed side surface abutting the guide bar and a surface at the free end thereof abutting an outwardly extending surface of one of said teeth when said plunger is in an extended position to thereby lock said wheel against rotary movement when the wheel is in one of its indexed positions, said plunger having movably secured thereto adjacent the free end thereof a member resiliently biased outwardly of the side surface of said plunger when the plunger is in its withdrawn position to make rotation inducing contact with said wheel upon movement of the plunger from its withdrawn position to its extended position.

6. In an indexing mechanism, a support, an indexing wheel rotatable on the support and having its outer periphery formed with a plurality of circumferentially arranged teeth each having a surface extending generally tangentially of a circle having a center coincident with the center of the wheel and a surface extending generally outwardly of the center of the wheel, a plunger secured to said support for movement between a withdrawn position and an extended position in a direction generally tangential to said circle, a guide bar secured to said support to guide the movement of said plunger, said plunger having a side surface abutting the tangential surface of one of said teeth, an oppositely disposed side surface abutting the guide bar and a surface at the free end thereof abutting an outwardly extending surface of one of said teeth when said plunger is in an extended position to thereby lock said wheel against rotary movement when the wheel is in one of its indexed positions, said plunger having movably secured thereto adjacent the free end thereof a member resiliently biased outwardly of the side surface of said plunger when the plunger is in its withdrawn position to make rotation inducing contact with said wheel upon movement of the plunger from its wtihdrawn position to its extended position, and a member movably secured to said guide bar biased into contact with the wheel while the plunger is in its withdrawn position to thereby prevent counter rotation of said wheel.

7. In an indexing mechanism, a support, an indexing wheel rotatably mounted on the support and having its outer periphery formed with a plurality of circumferentially arranged teeth each having a surface extending generally tangentially of a circle having a center coincident with the center of the wheel and a surface extending generally outwardly of the center of the wheel, a pair of parallel guide bars on said support, a plunger on said support mounted for movement between said guide bars between a withdrawn position and an extended position in a direction generally tangential to said circle, said plunger having a side surface abutting the tangential surface of one of said teeth, an oppositely disposed side surface abutting one of said guide bars and a surface at the free end thereof abutting an outwardly extending surface of one of said teeth when said plunger is in an extended position to thereby lock said wheel against rotary movement when the wheel is in one of its indexed positions, said plunger having movably secured thereto, adjacent the free end thereof a member resiliently biased outwardly of the side surface of said plunger when the plunger is in its withdrawn position to make rotation inducing contact with said wheel upon movement of the plunger from its withdrawn position to its extended position, and means to prevent counter rotation of said wheel while the plunger is in its withdrawn position.

8. In an indexing mechanism, a support, an indexing wheel rotatably mounted on said support and having its outer periphery formed with a plurality of circumferentially arranged teeth, each tooth having a surface extending generally tangentially of a circle having a center coincident with the center of the indexing wheel and a surface extending generally outwardly of the center of the indexing wheel, and a plunger on said support mounted for movement between a withdrawn position and an extended position in a direction generally tangential to said circle, said plunger having a side surface abutting the tangential surface of one of said teeth and a surface at the free end thereof contacting an adjacent outwardly extending surface of one of said teeth when said plunger is in its extended position to thereby lock the wheel against rotary movement in one of its indexed positions, the side surface of said plunger adajcent the free end thereof having a recess therein, a dog movably secured in said recess and resilient means in said recess to bias the dog outwardly of the side surface of said plunger when said plunger is in its withdrawn position so as to make rotation inducing contact with said wheel when said plunger is moved from its withdrawn position to its extended position.

9. In an indexing mechanism, a support, an indexing wheel rotatably mounted on said support and having its outer periphery formed with a plurality of circumferentially arranged teeth, each tooth having a surface extending generally tangentially of a circle having a center coincident with the center of the indexing wheel and a surface extending generally outwardly of the center of the indexing wheel, a pair of parallel guide bars on said support adjacent said wheel, and a plunger on said support mounted for movement between said guide bars between a withdrawn position and an extended position in a direction generally tangential to said circle, said plunger having a side surface abutting the tangential surface of one of said teeth, a side surface abutting one of said guide bars and a surface at the free end thereof contacting an outwardly extending surface of one of said teeth when said plunger is in its extended position to thereby lock the wheel against rotary movement in one of its indexed positions, the side surface of said plunger abutting the tangential surface having a recess therein, a dog movably secured in said recess and resilient means in said recess to bias the dog outwardly of the side surface of said plunger when said plunger is in its withdrawn position so as to make rotation inducing contact with said wheel when said plunger is moved from its withdrawn position to its extended position.

10. In an indexing mechanism, a support, an indexing wheel rotatably mounted on said support and having its outer periphery formed with a plurality of of substantially identical circumferentially arranged teeth, each tooth having a flat rectangular surface extending generally tangentially of a circle having a center coincident with the center of the indexing wheel and a flat rectangular surface extending radially outwardly of the center of the indexing wheel, a pair of flat-sided guide bars on said support adjacent said wheel, an elongate flat-sided plunger on said support mounted for movement between said guide bars between a withdrawn position and an extended position in a direction generally tangential to said circle, said plunger having a side surface abutting the tangential surface of one of said teeth an oppositely disposed side surface abutting one of said guide bars, and a surface at the free end thereof abutting an outwardly extending surface of one of said teeth when said plunger is in its extended position to thereby lock the wheel against rotary movement in one of its indexed positions, the side surface of said plunger abutting the tangential surface having a recess therein, a dog pivotally secured in said recess and resilient means in said recess to pivot the dog outwardly of the side surface of said plunger when said plunger is in its withdrawn position so as to make rotation inducing contact with said wheel when said plunger is moved from its withdrawn position to its extended position.

11. In an indexing mechanism as set forth in claim 10 and wherein the guide bar which is in abutting relationship with a side surface of said plunger when the plunger is in its extended position has a recess therein, a pivotally mounted dog in said recess and resilient means in said recess to bias the dog outwardly into contact with the wheel when the plunger is in its withdrawn position to thereby prevent counter rotation of said wheel.

References Cited by the Examiner
UNITED STATES PATENTS

| | | | |
|---|---|---|---|
| 2,166,716 | 7/39 | Chandler | 74—128 |
| 2,272,929 | 2/42 | Barth | 74—128 X |
| 2,398,178 | 4/46 | Ellison | 74—128 X |
| 2,594,828 | 4/52 | Tripp | 74—128 |
| 2,663,193 | 12/53 | Tucker | 74—152 |

BROUGHTON G. DURHAM, *Primary Examiner.*